US012147849B2

(12) United States Patent
Barik et al.

(10) Patent No.: US 12,147,849 B2
(45) Date of Patent: Nov. 19, 2024

(54) WORK STEALING IN HETEROGENEOUS COMPUTING SYSTEMS

(71) Applicant: Intel Corporation, Santa Clara, CA (US)

(72) Inventors: Rajkishore Barik, Santa Clara, CA (US); Stephan A. Herhut, Santa Clara, CA (US); Jaswanth Sreeram, San Jose, CA (US); Tatiana Shpeisman, Menlo Park, CA (US); Richard L. Hudson, Florence, MA (US)

(73) Assignee: Intel Corporation, Santa Clara, CA (US)

( * ) Notice: Subject to any disclaimer, the term of this patent is extended or adjusted under 35 U.S.C. 154(b) by 300 days.

(21) Appl. No.: 17/493,419

(22) Filed: Oct. 4, 2021

(65) Prior Publication Data
US 2022/0027210 A1    Jan. 27, 2022

Related U.S. Application Data

(63) Continuation of application No. 15/391,549, filed on Dec. 27, 2016, now Pat. No. 11,138,048, which is a
(Continued)

(51) Int. Cl.
*G06F 9/50* (2006.01)
*G06F 13/42* (2006.01)

(52) U.S. Cl.
CPC ............ *G06F 9/5083* (2013.01); *G06F 9/505* (2013.01); *G06F 13/4239* (2013.01)

(58) Field of Classification Search
CPC ..... G06F 9/5083; G06F 9/505; G06F 13/4239
See application file for complete search history.

(56) References Cited

U.S. PATENT DOCUMENTS 6,748,593 B1   6/2004 Brenner et al.
6,826,583 B1   11/2004 Flood et al.
(Continued)

FOREIGN PATENT DOCUMENTS

CN    101091175 A    12/2007
CN    101095103 A    12/2007
(Continued)

OTHER PUBLICATIONS

European Patent Office, "Communication under Rule 71(3)," issued in connection with European Patent Application No. 17 177 561.2, dated Dec. 6, 2021, 7 pages.
(Continued)

*Primary Examiner* — Jacob D Dascomb
(74) *Attorney, Agent, or Firm* — Hanley, Flight & Zimmerman, LLC

(57) ABSTRACT

Methods, apparatus, systems, and articles of manufacture are disclosed to steal work in heterogeneous computing systems. An apparatus includes load balancing circuitry to obtain tasks from a workload by encoding minimum and maximum index ranges of a data parallel operation, allocate a first task from the workload to a first work queue based on a first capability of first computation circuitry, the first computation circuitry to process the first task in the first work queue, and allocate a second task from the workload to a second work queue, second computation circuitry to process the second task in the second work queue. The apparatus further includes first work stealer logic to steal the second task from the second work queue using an atomic operation to access the second work queue.

25 Claims, 7 Drawing Sheets

Related U.S. Application Data continuation of application No. 13/976,579, filed as application No. PCT/US2013/032707 on Mar. 15, 2013, now abandoned.

(56) References Cited

U.S. PATENT DOCUMENTS

| | | | |
|---|---|---|---|
| 7,117,502 B1 | 10/2006 | Harris | |
| 7,167,916 B2* | 1/2007 | Willen | G06F 9/5044 |
| | | | 718/100 |
| 7,516,456 B2 | 4/2009 | Aguilar, Jr. et al. | |
| 7,962,900 B2* | 6/2011 | Barraclough | G06F 9/526 |
| | | | 717/114 |
| 8,321,558 B1 | 11/2012 | Sirota et al. | |
| 8,539,493 B1 | 9/2013 | Robertson et al. | |
| 8,806,497 B2 | 8/2014 | Sinz | |
| 8,959,525 B2 | 2/2015 | Agarwal et al. | |
| 9,135,083 B2 | 9/2015 | Michael et al. | |
| 11,138,048 B2 | 10/2021 | Barik et al. | |
| 2004/0054999 A1 | 3/2004 | Willen et al. | |
| 2005/0210472 A1 | 9/2005 | Accapadi et al. | |
| 2009/0300224 A1 | 12/2009 | Duffy et al. | |
| 2010/0031267 A1* | 2/2010 | Maessen | G06F 9/5066 |
| | | | 718/105 |
| 2011/0055838 A1 | 3/2011 | Moyes | |
| 2011/0099553 A1 | 4/2011 | Agarwal et al. | |
| 2011/0161976 A1 | 6/2011 | Alexander et al. | |
| 2011/0202745 A1 | 8/2011 | Bordawekar et al. | |
| 2012/0054771 A1* | 3/2012 | Krishnamurthy | G06F 9/4881 |
| | | | 718/105 |
| 2012/0102501 A1 | 4/2012 | Waddington et al. | |
| 2012/0191947 A1 | 7/2012 | Horii et al. | |
| 2012/0192201 A1 | 7/2012 | Sander et al. | |
| 2013/0014114 A1* | 1/2013 | Nagata | G06F 9/52 |
| | | | 718/102 |
| 2013/0117808 A1* | 5/2013 | Shin | G06F 21/50 |
| | | | 726/1 |
| 2013/0155080 A1 | 6/2013 | Nordlund et al. | |
| 2014/0282562 A1* | 9/2014 | Xing | G06F 9/4881 |
| | | | 718/102 |
| 2016/0154677 A1 | 6/2016 | Barik et al. | |
| 2017/0109213 A1 | 4/2017 | Barik et al. | |

FOREIGN PATENT DOCUMENTS

| | | |
|---|---|---|
| CN | 101960418 A | 1/2011 |
| CN | 102053870 A | 5/2011 |
| CN | 102360313 A | 2/2012 |
| WO | 2012/082557 A2 | 6/2012 |

OTHER PUBLICATIONS

The State Intellectual Property Office of People's Republic of China, "The Third Office Action," issued in connection X with Chinese Patent Application No. 201710028738.2, dated Oct. 28, 2022, 7 pages.

The State Intellectual Property Office of People's Republic of China, "Notification to Grant Patent Right for Invention," Issued in connection with Chinese Patent Application No. 201710028738.2, dated Jan. 11, 2023, 6 pages (English translation included).

Pinto et al., "Scheduling by Work-Stealing in Hybrid Parallel Architectures," 10th Workshop on Parallel and Distributed Processing (WSPPD), Aug. 2012, 7 pages.

Blumofe et al., "Scheduling Multithreaded Computations by Work Stealing," 35th Annual Symposium on Foundations of Computer Science, Nov. 1994, 13 pages.

Frigo et al., "The Implementation of the Cilk-5 Multithreaded Language," Proceedings of the ACM SIGPLAN 1998 Conference on Programming Language Design and Implementation, Jun. 1998, 12 pages.

European Patent Office, "Extended European Search Report," issued in connection with European Patent Application No. 13877641.4, on Oct. 28, 2016, 9 pages.

European Patent Office, "Communication pursuant to Article 94(3) EPC," issued in connection with European Patent Application No. 13877641.4, on Sep. 5, 2017, 6 pages.

International Searching Authority, "International Search Report and Written Opinion," issued in connection with International Patent Application No. PCT/US2013/032707, on Dec. 18, 2013, 8 pages.

International Bureau, "International Preliminary Report on Patentability," issued in connection with International Patent Application No. PCT/US2013/032707, on Sep. 15, 2015, 6 pages.

European Patent Office, "Extended European Search Report," issued in connection with European Patent Application No. 17177561.2, on Sep. 7, 2017, 10 pages.

The State Intellectual Property Office of People's Republic of China, "First Office Action," issued in connection with Chinese Patent Application No. 201710028738.2, on Jun. 5, 2019, 15 pages including partial English translation.

European Patent Office, "Communication pursuant to Article 94(3) EPC," issued in connection with European Patent Application No. 17177561.2, on Apr. 1, 2019, 5 pages.

The State Intellectual Property Office of People's Republic of China, "The Second Office Action," issued in connection with Chinese Patent Application No. 201380073056.3, on Apr. 28, 2019, 30 pages including partial English translation.

The State Intellectual Property Office of People's Republic of China, "The Third Office Action," issued in connection with Chinese Patent Application No. 201380073056.3, on Oct. 12, 2020, 12 pages including partial English translation.

The State Intellectual Property Office of People's Republic of China, "Decision of Rejection," issued in connection with Chinese Patent Application No. 201710028738.2, on May 25, 2020, 5 pages including partial English translation.

The State Intellectual Property Office of People's Republic of China, "Reexamination Decision," issued in connection with Chinese Patent Application No. 201380073056.3, on May 11, 2020, 2 pages including partial English translation.

European Patent Office, "Decision to grant a European patent pursuant to Article 97(1) EPC," issued in connection with European Patent Application No. 13877641.4, on Aug. 29, 2019, 2 pages.

European Patent Office, "Communication under Rule 71(3) EPC," issued in connection with European Patent Application No. 13877641. 4, on Apr. 8, 2019, 7 pages.

United States Patent and Trademark Office, "Non-Final Office Action," issued in connection with U.S. Appl. No. 13/976,579, on May 9, 2016, 20 pages.

United States Patent and Trademark Office, "Final Office Action," issued in connection with U.S. Appl. No. 13/976,579, on Sep. 30, 2016, 21 pages.

United States Patent and Trademark Office, "Advisory Action," issued in connection with U.S. Appl. No. 13/976,579, on Nov. 16, 2016, 3 pages.

United States Patent and Trademark Office, "Non-Final Office Action," issued in connection with U.S. Appl. No. 13/976,579, on Apr. 5, 2017, 21 pages.

United States Patent and Trademark Office, "Final Office Action," issued in connection with U.S. Appl. No. 13/976,579, on Sep. 7, 2017, 23 pages.

European Patent Office, "Communication pursuant to Article 94(3) EPC," issued in connection with European Patent Application No. 17177561.2, on Jul. 23, 2020, 4 pages.

The State Intellectual Property Office of People's Republic of China, "The Fourth Office Action," issued in connection with Chinese Patent Application No. 201380073056.3, on Mar. 17, 2021, 10 pages including partial English translation.

United States Patent and Trademark Office, "Final Office Action," issued in connection with U.S. Appl. No. 15/391,549, on Apr. 6, 2020, 19 pages.

United States Patent and Trademark Office, "Notice of Allowance," issued in connection with U.S. Appl. No. 15/391,549, on May 18, 2021, 9 pages.

United States Patent and Trademark Office, "Non-Final Office Action," issued in connection with U.S. Appl. No. 15/391,549, on Jan. 28, 2021, 11 pages.

(56) References Cited

OTHER PUBLICATIONS

The State Intellectual Property Office of People's Republic of China, "The Second Office Action," issued in connection with Chinese Patent Application No. 201710028738.2, on Feb. 3, 2020, 15 pages including partial English translation.
The State Intellectual Property Office of People's Republic of China, "Notification to Grant Patent Right for Invention," issued in connection with Chinese Patent Application No. 201380073056.3, on Oct. 11, 2021, 4 pages including partial English translation.
The State Intellectual Property Office of People's Republic of China, "Notice of Re-Examination," issued in connection with Chinese Patent Application No. 201710028738.2, on Jul. 27, 2022, 6 pages including partial English translation.
United States Patent and Trademark Office, "Non-Final Office Action," issued in connection with U.S. Appl. No. 15/391,549, mailed on Mar. 29, 2018, 13 pages.
United States Patent and Trademark Office, "Final Office Action," issued in connection with U.S. Appl. No. 15/391,549, mailed on Dec. 14, 2018, 16 pages.
United States Patent and Trademark Office, "Non-Final Office Action," issued in connection with U.S. Appl. No. 15/391,549, mailed on Aug. 29, 2019, 19 pages.
The State Intellectual Property Office of People's Republic of China, "Office Action," issued in connection with Chinese Patent Application No. 201380073056.3, dated Dec. 26, 2019, 8 pages. [English language machine translation included.].
European Patent Office, "Communication under Rule 71(3) EPC," issued in connection with European Patent Application No. 17177561.2-1224, Feb. 22, 2022, 5 pages.
European Patent Office, "Decision to grant a European patent pursuant to Article 97(1) EPC," issued in connection with European patent appl. No. 17177561.2-1203, Jul. 7, 2022, 1 page.

\* cited by examiner

WORK STEALING IN HETEROGENEOUS COMPUTING SYSTEMS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

Background Information

Computer systems often have one or more hardware accelerator devices in addition to general-purpose processors deployed as central processing units (CPUs). One widely used example of such a hardware accelerator device is a graphics processing unit (GPU). GPUs have traditionally been used as part of a graphics subsystem primarily to drive one or more displays. The GPUs help to offload work from the CPUs thereby allowing the CPUs resources to be used for other tasks. The CPU is typically implemented as a general-purpose processor and is generally well suited for performing various different types of algorithms (e.g., processing of a general nature). In contrast, the GPU is often implemented as a special-purpose processor, or at least more specialized processor, which is generally better suited for performing a limited number of specialized algorithms (e.g., graphics-related algorithms). GPUs often have highly-parallel computational hardware that tends to allow them to quickly process graphics data.

More recently it has been recognized that GPUs may be used for other non-graphics applications. For example, general-purpose computing on GPUs (GPGPU) generally represents the utilization of GPUs to perform general-purpose type computations of the type that have traditionally been reserved for CPUs. The highly-parallel computational hardware of the GPUs may often be employed to significantly accelerate such computations. When used in this way, at least when implemented correctly, GPUs may help to significantly accelerate computationally-intensive applications.

However, one challenge with using a GPU to accelerate non-graphics applications (e.g., as in the case of GPGPU) involves work scheduling. In order to effectively utilize both the CPU and the GPU, it is important to schedule and distribute work between the CPU and the GPU in an effective way. In one possible approach, the CPU may merely offload or assign a specific task to the GPU. The CPU may then wait, or perform other tasks, while the GPU finishes the assigned task and provides the results. However, in this approach, there is no real collaboration between the CPU and the GPU in processing the same workload. That is, the CPU and GPU may not work concurrently on different portions of the same workload. It is not really hybrid execution.

According to another approach, the CPU and the GPU may engage in hybrid execution in which they work collaboratively on different portions of a parallel workload statically scheduled on both the CPU and the GPU. Such hybrid execution may offer a potential advantage of concurrent utilization of both the CPU and the GPU on the same workload. However, it tends to be challenging to effectively schedule different portions of a workload between the CPU and the GPU. For example, the CPUs and GPUs may operate at different clock speeds and/or may have different memory hierarchies and/or may have different workload-based performance characteristics. Code that may be executed effectively on one of the CPU and GPU may be executed much less effectively on the other. The existence of other competing workloads and/or power constraints may further tend to complicate the ability to schedule the workloads effectively a priori. A drawback is that, if the workloads are not scheduled effectively, then one of the CPU and the GPU may become overly burdened, while the other may be underutilized.

BRIEF DESCRIPTION OF THE DRAWINGS

The invention may best be understood by referring to the following description and accompanying drawings that are used to illustrate embodiments of the invention. In the drawings.

DETAILED DESCRIPTION OF EMBODIMENTS

In the following description, numerous specific details are set forth (e.g., specific processing units, heterogeneous computer systems, sequences of operations, logic partitioning/integration details, types and interrelationships of system components, and the like). However, it is understood that embodiments of the invention may be practiced without these specific details. In other instances, well-known circuits, structures and techniques have not been shown in detail in order not to obscure the understanding of this description.

Figure 1:
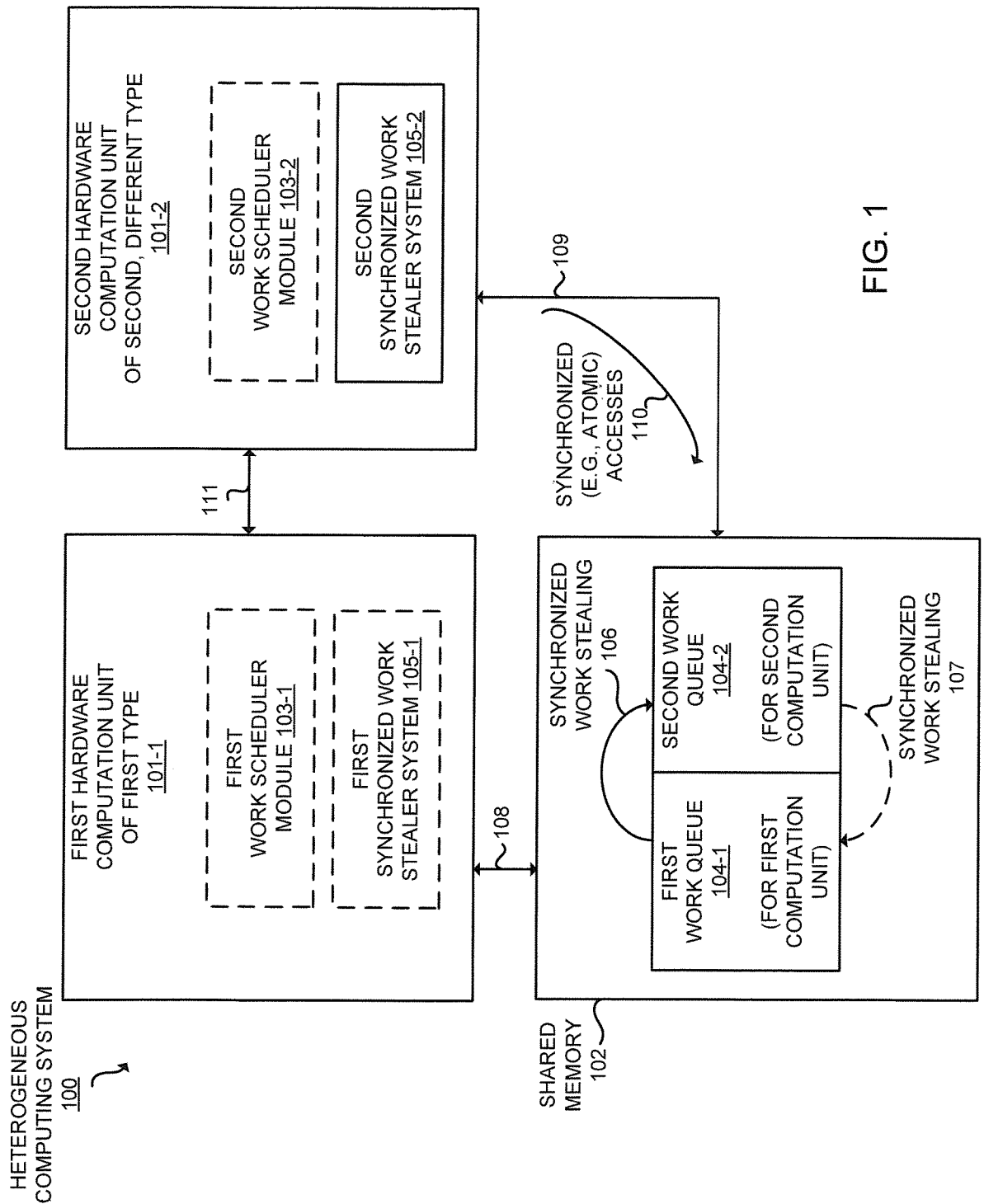
FIG. 1 is a block diagram of an embodiment of a heterogeneous computing or computer system.

FIG. 1 is a block diagram of an embodiment of a heterogeneous computing or computer system 100. In various embodiments, the heterogeneous computing system may represent a desktop computer, a laptop computer, a notebook computer, a netbook computer, a workstation, a personal digital assistant (PDA), a smartphone, a cellular telephone, a mobile computing device, a server, an Internet appliance, or various other types of computer systems or other computing systems known in the arts.

The heterogeneous computing system includes at least two heterogeneous (i.e., different) types of hardware computation units. The hardware computation units may also be referred to herein as compute units. In the illustrated embodiment, the heterogeneous computer system includes a first hardware computation unit 101-1 of a first type, and a second hardware computation unit 101-2 of a second, different type. The first and second computation units are coupled together, for example, by interconnect 111. Other embodiments may include three or more heterogeneous computation units. Examples of suitable computation units include, but are not limited to, processors, cores, hardware threads, thread slots, hardware capable of maintaining an independent execution state, etc.

In some embodiments, the first computation unit 101-1 may be a general-purpose computation unit (or at least relatively more general-purpose than the second computation unit 101-2), whereas the second computation unit 101-2 may not be a general-purpose computation unit and/or may be a special-purpose computation unit (or at least relatively more special-purpose than the first computation unit 101-1). In some embodiments, the first computation unit 101-1 may be one of a CPU, a general-purpose processor, and a general-purpose core, whereas the second computation unit may not be. For example, the second computation unit 101-2 may be one of a graphics processor (e.g., a GPU, a graphics co-processor, a graphics core, etc.), a hardware accelerator device (e.g., a special-purpose accelerator, a fixed-function accelerator, etc.), a cryptographic processor, a communications processor, a network processor, a special-purpose processor, a special-purpose core, a highly-parallel special-purpose hardware, a digital signal processor (DSP), a field programmable gate array (FPGA), or the like.

In some embodiments, the first computation unit 101-1 may be a CPU, whereas the second computation unit may be a graphics processor (e.g., a GPU, a graphics co-processor, a graphics core, etc.), although the scope of the invention is not so limited. In such embodiments, the heterogeneous computing system may represent a GPGPU system, a CPU-GPU collaborative system, or the like. In this detailed description, often a CPU and a GPU are used as examples of the first and second heterogeneous computation units, although it is to be appreciated that in alternate embodiments other different combinations of heterogeneous computation units may be used instead (e.g., a relatively more general-purpose processor together with a relatively more special-purpose processor selected from among a special-purpose processor, a special-purpose core, a hardware accelerator device, a DSP, a FPGA, etc.).

Referring again to FIG. 1, the first computation unit 101-1 and the second computation unit 101-2 are each operable to be coupled with a shared memory 102, for example by interconnects 108, 109, when deployed in the heterogeneous computing system. The shared memory is accessible to and shared by both the first and second computation units. In some embodiments, the shared memory may represent shared virtual memory. The shared memory, or shared virtual memory, may represent a portion of a physical memory implemented in one or more memory devices of one or more memory types. In some embodiments, the shared memory may be implemented in a dynamic random access memory (DRAM), although the scope of the invention is not so limited.

In some embodiments, a first work queue 104-1 corresponding to the first computation unit 101-1, and a second work queue 104-2 corresponding to the second computation unit 101-2, may be stored in the shared memory 102. The first work queue 104-1 may be operable to receive and queue work for the first computation unit 101-1. The second work queue 104-2 may be operable to receive and queue work for the second computation unit 101-2. For simplicity in the illustration, only two work queues are shown, although in some embodiments there may be multiple work queues for the first computation unit (e.g., for each of multiple cores) and/or multiple work queues for the second computation unit (e.g., optionally for each of multiple multiprocessors or other groups of cores).

Referring again to FIG. 1, in some embodiments, the first computation unit 101-1 (e.g., a CPU, general-purpose processor, general-purpose core, etc.) may include a first work scheduler module 103-1. The first work scheduler module 103-1 may be operable to schedule work on the first computation unit 101-1. In some embodiments, the second computation unit 101-2 (e.g., a GPU, graphics core, hardware accelerator, special-purpose processor, special-purpose core, etc.) may include a second work scheduler module 103-2. The second work scheduler module 103-2 may be operable to schedule work on the second computation unit 101-2. In some embodiments, the first and second work scheduler modules may be operable to schedule work on the first and second computation units to achieve hybrid execution and/or collaborative/cooperative computation on different portions of a common workload (e.g., different portions of a data parallel workload) on heterogeneous computation units. For example, a CPU and a GPU may work together in GPGPU in some embodiments.

By way of example, a workload may be divided into chunks, work units, or other portions. These chunks, work units, or portions may be scheduled among the first and second computation units and queued in the corresponding first and second work queues. In some embodiments, such queues could, for example, be implemented by encoding a series of minimum and maximum index ranges of a data parallel operation, where a single unit of work may be represented as a tuple (e.g., min1, max1). The overall index range of the data parallel operation may be divided into chunks of work. In some cases, the size of the chunks may optionally be chosen such that it corresponds to a multiple of the number of hardware threads, SIMD lanes, or cores, of a computation unit (e.g., a GPU). Furthermore, it may optionally be larger than the overall number of hardware threads, SIMD lanes, or cores divided by the number of barriers the computation unit concurrently supports. Although not required, this may help to ensure that the chunks of work efficiently utilize computing resources and that initial scheduling is effective with the hardware thread scheduler, if there is one. The chunks may then be distributed, for example evenly, or based on various algorithms/criteria, between the work queues. During runtime, each of the computation units may retrieve and process the chunks or work units from its corresponding work queue.

This may continue until the work load has been completed. By way of example, completion may be indicated by all the queues being empty. In some cases, a termination token may optionally be used. For example, the termination token may represent a maximum integer value as the termination token TERM EMPTY. In embodiments where all computation workers steal in a deterministic order, and no worker generates more work, a return of value EMPTY generally will indicate termination. In embodiments allowing random stealing operations, it is sufficient to have at least one worker (e.g., a CPU thread) traverse all queues in a deterministic order after it runs out of work itself. If it finds all queues empty it may write the EMPTY termination token to all queues, or at least to all work queue(s) for the other computation unit (e.g., the GPU). This may help to terminate the data parallel workload.

In some embodiments, work stealing may be performed, for example, in order to help improve load balancing, increase performance, reduce power consumption, or the like. The term "work stealing" is a term used in the art. As used herein, the term "work stealing" is used broadly to refer to reassigning or re-tasking the work from one computation unit to the other, moving the work from one computation unit's queue to another computation unit's queue, allowing a computation unit to claim or take responsibility for work previously claimed by or under the responsibility of another computation unit, and the like.

Referring again to FIG. 1, in some embodiments, the first computation unit 101-1 (e.g., a CPU, general-purpose processor, general-purpose core, etc.) may optionally include an embodiment of a first synchronized work stealer system 105-1, although this is not required. The first synchronized work stealer system 105-1 may be operable to perform synchronized work stealing from the second computation unit 101-2 for the first computation unit 101-1 to do the work, although the scope of the invention is not so limited. In some embodiments, the first synchronized work stealer system 105-1 may have access to both the first 104-1 and second 104-2 work queues. The first synchronized work stealer system may be implemented in any combination of software, firmware, and hardware.

In some embodiments, the second computation unit 101-2 (e.g., a GPU, graphics core, hardware accelerator, special-purpose processor, special-purpose core, etc.) may include an embodiment of a second synchronized work stealer system 105-2. In some embodiments, the second synchronized work stealer system 105-2 may be operable to perform synchronized work stealing from the first computation unit 101-1 for the second computation unit 101-2 to do the work. The stolen work may be taken from the first work queue 104-1 and added to the second work queue 104-2. In some embodiments, the second synchronized work stealer system 105-2 may have access to both the first 104-1 and second 104-2 work queues. The second synchronized work stealer system may be implemented in any combination of software, firmware, and hardware.

In some embodiments, work stealing may be based on the current fullness of the first 104-1 and/or second 104-2 work queues. For example, in some embodiments, if the second work queue 104-2 runs empty, is filled below a threshold level, or is perceived by the second synchronized work stealer system 105-2 as being insufficiently full, then the second synchronized work stealer system 105-2 may steal work from the first work queue 104-1 and put the stolen work in the second work queue 104-2. As another example, in some embodiments, if the second synchronized work stealer system 103-2 perceives that the first work queue 104-1 is full, is filled above a threshold level, or is otherwise too full, then the second synchronized work stealer system 103-2 may steal work from the overly filled first work queue 104-1. In other embodiments, the first synchronized work stealer system 103-1 may perform analogous or reciprocal types of work stealing when the first work queue 104-1 is under filled and/or when the second work queue 104-2 is overfilled. Other reasons for work stealing are also contemplated.

In some embodiments, the work stealing may be bidirectional in either direction between the first and second computation units. For example, the first synchronized work stealer system 105-1 may steal work from the second computation unit 101-2 for the first computation unit 101-1 to do (e.g., move work from the second work queue 104-2 to the first work queue 104-1), and the second synchronized work stealer system 105-2 may steal work from the first computation unit 101-1 for the second computation unit 101-2 to do (e.g., move work from the first work queue 104-1 to the second work queue 104-2). In some embodiments, bidirectional mutually synchronized work stealing, may be performed. In some embodiments, random substantially concurrent bidirectional mutually synchronized work stealing may optionally be used. In other embodiments, the second computation unit 101-2 may optionally steal work from the first computation unit 101-1, without the first computation unit stealing work from the second computation unit. This may not offer as great an advantage, but may help to allow a simpler implementation, if desired. In such cases, the first computation unit may optionally omit the synchronized work stealer system 105-1.

Referring again to FIG. 1, in some embodiments, synchronized work stealing operations 106, 107 may optionally be performed. In some embodiments, the synchronized work stealing operations may be performed through synchronized accesses to the work stealing queues 104-1, 104-2 and/or synchronized accesses to the shared memory 103. For example, the second computation unit 101-2 may issue synchronized (e.g., atomic accesses/operations 110) that help achieve the synchronized work stealing (e.g., the synchronized work stealing 106). In some embodiments, the synchronized work stealing operations may be used to help prevent two entities from stealing the same work and/or performing the same work. This may also help to prevent corruption of shared data structures used to implement the work queues and may help to allow them to transition from one valid state to another valid state. In some embodiments, the synchronized work stealing operations may be fully completed in that work may not be stolen from a queue but not executed by the stealing computation unit.

In some embodiments, the synchronized work stealing operations may be performed through one or more memory access synchronization primitives and/or instructions and/or operations. In some embodiments, the de-queue and steal operations may utilize a set of memory access sequencing primitives/instructions/operations that are supported by both the first and second computation units. In some embodiments, the memory access synchronization primitives/instructions/operations may be implemented on hardware that supports any desired such memory access synchronization primitives/instructions/operations between the first and second computation units (e.g., the CPU and GPU). Examples of suitable such primitives/instructions/operations include, but are not limited to, memory fence and/or barrier macroinstructions, atomic memory access macroinstructions, OpenCL atomic operations, CUDA memory access synchronization operations, or other approaches known in the arts.

By way of example, in an atomic memory access operation, a processor may substantially concurrently (e.g., in the same bus cycle) read a memory location and write to the memory location. Such an atomic operation may help to prevent other computation units or external devices from writing or reading the memory location until after completion of the atomic operation. Generally the atomic memory access operation will be performed entirely or not at all. Examples of such atomic memory access primitives/instructions/operations include, but are not limited to, read-modify-write, compare-and-swap, compare-and-exchange, test-and-set, compare-and-set, load-link/store-conditional instructions, and the like, and various combinations thereof. These may be done through macroinstructions, OpenCL atomic operations, CUDA memory access synchronization operations, or through other approaches known in the arts.

In some embodiments, these may include one or more memory access fence instructions. Memory access fence instructions are also sometimes referred to in the art (e.g., in some architectures) as memory access barrier instructions. Examples of such memory access fence and/or barrier instructions include, but are not limited to, load fences/barriers (e.g., the LFENCE instruction), store fences/barriers (e.g., the SFENCE instruction), and load and store fences/barriers (e.g., the MFENCE instruction), and the like, and various combinations thereof. Such fencing or barrier operations may be implemented through macroinstructions, OpenCL operations, CUDA operations, or through other approaches known in the arts.

Advantageously, such work stealing may help to allow more effective work scheduling and distribution between the first and second computation units, which may lead to better utilization of resources and increased performance. Because work stealing is allowed, and especially when bidirectional work stealing is allowed, it is not required to be able to statically schedule workloads amongst heterogeneous computation units in a highly effective way. As discussed in the background section, such static workload scheduling a priori tends to be difficult for a number of reasons (e.g., due to potentially different clock speeds, different memory hierarchies, different code execution efficiencies, existence of other workloads, power limits, etc.). Rather, if for some reason the work is initially scheduled in an ineffective way, and it results in one computation unit becoming overly burdened (or underutilized), work stealing may be performed in conjunction with load balancing in order to help rebalance the workloads and thereby help to mitigate the overutilization and/or underutilization of the various computation units. In other embodiments, rather than load balancing, the work stealing may optionally be performed to help achieve other objectives, such as, for example, to maximize processing speed, to reduce power consumption, etc.

Figure 2:
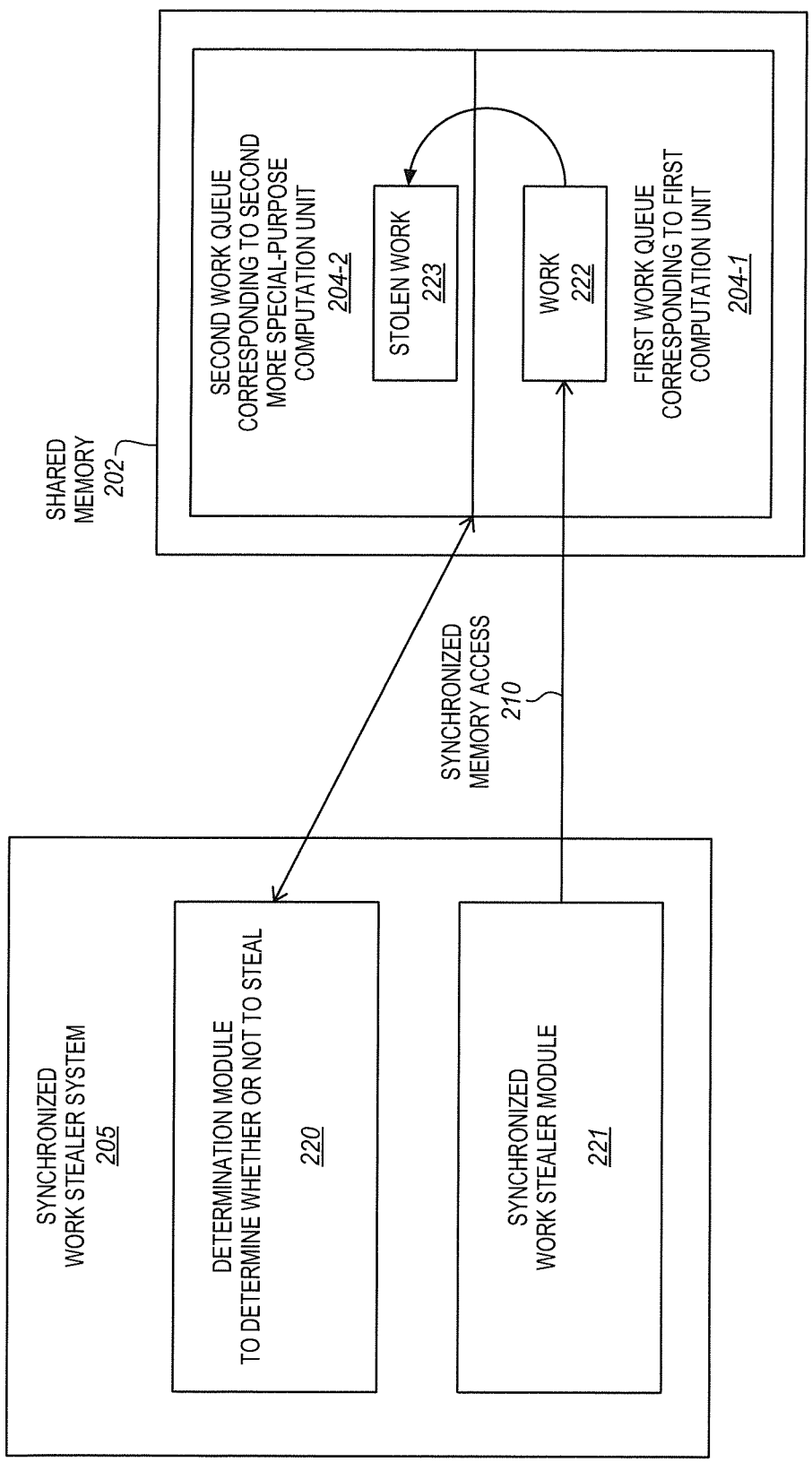
FIG. 2 is a block diagram of an embodiment of a synchronized work stealer system.

FIG. 2 is a block diagram of an embodiment of a synchronized work stealer system 205. Also shown are a first work queue 204-1 and a second work queue 204-2 in a shared memory 202. In some embodiments, the synchronized work stealer system of FIG. 2 may be included in the second hardware computation unit 101-2 and/or the heterogeneous computing system 100 of FIG. 1. Alternatively, the synchronized work stealer system FIG. 2 may be included in a similar or different computation unit or heterogeneous system. Moreover, the second hardware computation unit and heterogeneous system of FIG. 1 can include a similar or different synchronized work stealer system than that of FIG. 2.

The synchronized work stealer system 205 includes a determination module 220. The determination module is operable to determine whether or not to steal work 222 from a first hardware computation unit (e.g., first computation unit 101-1) of a first type for a second hardware computation unit (e.g., second computation unit 101-2) of a second, different type. In some embodiments, the second type may be more special-purpose than the first type. The work 222 may be queued in the first work queue 204-1 corresponding to the first hardware computation unit. The first work queue is in the shared memory 202, which is shared by the first and second hardware computation units. As shown, in some embodiments, the determination module may be coupled with, or otherwise in communication with, the first work queue 204-1 and/or the second work queue 204-2. In some embodiments, the determination module may make the determination of whether or not to steal the work based on the fullness or one or more of the work queues. This may be done as described elsewhere herein.

The synchronized work stealer system 205 also includes a synchronized work stealer module 221. The synchronized work stealer module is operable to steal the work 222 from the first hardware computation unit and/or the first queue 204-1 and provide it as stolen work 223 for the second hardware computation unit and/or add it to the second work queue 204-2. In some embodiments, the synchronized work stealer module may be operable to steal the work through a synchronized memory access 210 to the first work queue 204-1. In some embodiments, the synchronized memory access 210 may be synchronized relative to memory accesses to the first work queue from the first hardware computation unit.

Figure 3:
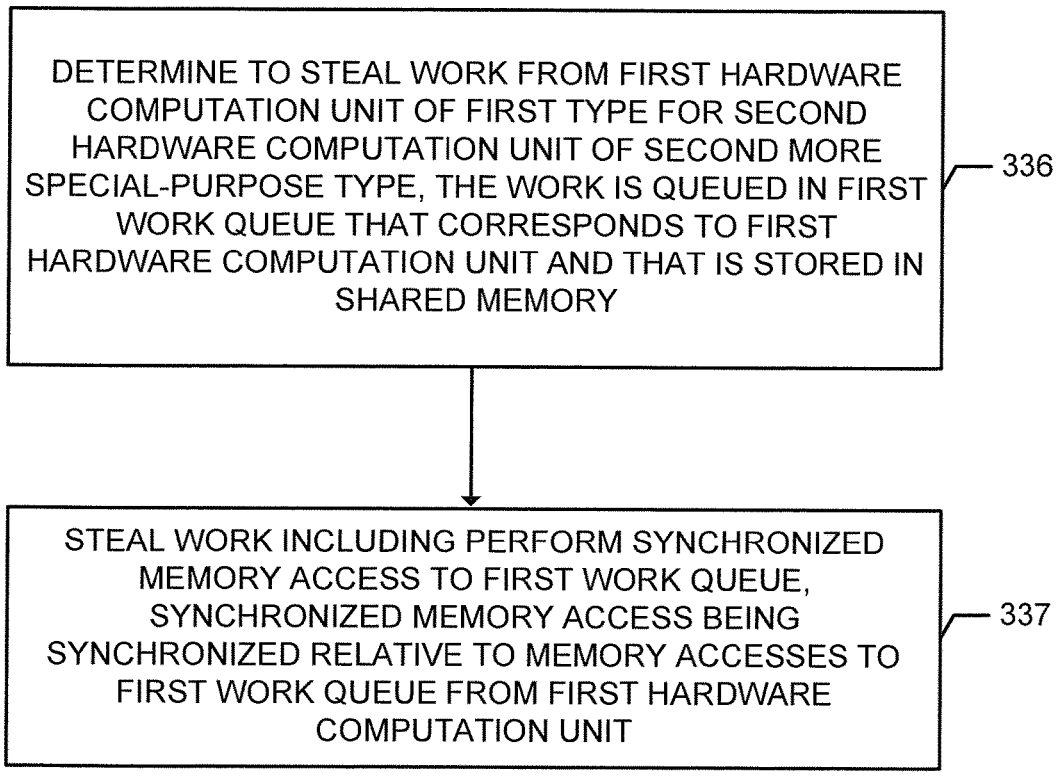
FIG. 3 is a block flow diagram of an embodiment of a method of stealing work in a heterogeneous computer system.

FIG. 3 is a block flow diagram of an embodiment of a method 335 of stealing work in a heterogeneous computer system. In some embodiments, the operations and/or method of FIG. 3 may be performed by and/or within the synchronized work stealing system 105-2 of FIG. 1 and/or the synchronized work stealing system 205 of FIG. 2. The components, features, and specific optional details described herein for these systems also optionally apply to the operations and/or method, which may in embodiments be performed by and/or within these systems. Alternatively, the operations and/or method of FIG. 3 may be performed by and/or within a similar or different synchronized work stealing system. Moreover, the synchronized work stealing systems of FIGS. 1 and/or 2 may perform similar or different operations and/or methods than those of FIG. 3.

The method includes determining to steal work from a first hardware computation unit of a first type for a second hardware computation unit of a second type that is more special-purpose than the first type, at block 336. In some embodiments, the work may be queued in a first work queue that corresponds to the first hardware computation unit. In some embodiments, the first work queue may be stored in a shared memory that is shared by the first and second hardware computation units.

The method also includes stealing the work, at block 337. In some embodiments, stealing the work may include performing a synchronized memory access to the first work queue. In some embodiments, the synchronized memory access may be synchronized relative to memory accesses to the first work queue from the first hardware computation unit.

Figure 4:
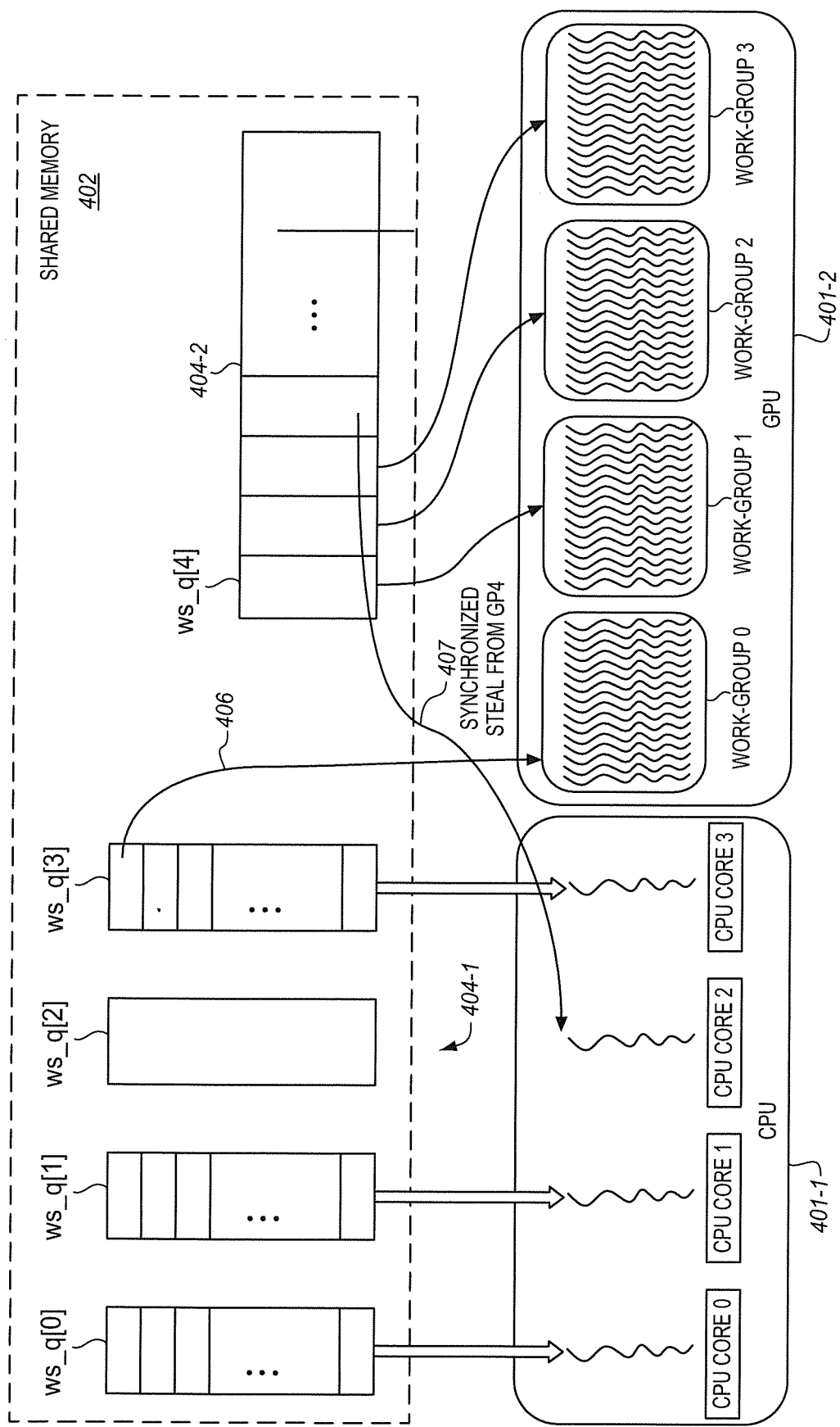
FIG. 4 is a block diagram illustrating an embodiment of bidirectional synchronized work stealing between an embodiment of a CPU and an embodiment of a GPU.

FIG. 4 is a block diagram illustrating an embodiment of bidirectional synchronized work stealing 406, 407 between an embodiment of a CPU 401-1 and an embodiment of a GPU 401-2. The illustrated example of the CPU has four cores, namely a CPU core 0, a CPU core 1, a CPU core 2, and a CPU core 3. Other CPUs may have either fewer or more cores. In the illustrated embodiment, each of these cores has a different work queue of a first set of work queues 404-1 that correspond to the CPU. In particular, in the illustrated example, a work queue ws_q[0] corresponds to CPU core 0, a work queue ws_q[1] corresponds to CPU core 1, a work queue ws_q[2] corresponds to CPU core 2, and a work queue ws_q[3] corresponds to CPU core 3. In other embodiments, either multiple-to-one, or one-to-multiple correspondence between cores and work queues may be used.

The illustrated example of the GPU has four work-groups, namely a work-group 0, a work-group 1, a work-group 2, and a work-group 3. These work-groups may also be referred to as streaming units or multiprocessor. In the illustration, each work-group has 16 SIMD lanes, although other embodiments may have fewer or more SIMD lanes. Moreover, other GPUs may have either fewer or more work-groups. For example, some GPUs have on the order of tens of multiprocessors or work-groups. Each of these work-groups may include one or more cores, or potentially many cores. For example, some GPUs have on the order of tens of cores per multiprocessor or work-group. In the illustrated embodiment, each of these work-groups shares a second work queue 404-2 that corresponds to the GPU. In other embodiments, multiple work queues may be used each for one or more of the work-groups. The work queues 404-1, 404-2 may be in shared memory 402.

Examples of bidirectional synchronized work stealing operations 406, 407 are shown in the illustration. While CPU core 0, CPU core 1, and CPU core 3 are working from their own corresponding work queues ws_q[0], ws_q[1], and ws_q[3], respectively, the CPU core 2 is performing a synchronized work steal operation 407 from the GPU queue 404-2. Similarly, work-group 0 (aka streaming unit 0) is performing a synchronized work steal operation 406 from work queue ws_q[3] corresponding to CPU core 3. This is just one illustrative example. The work stealing operations 406, 407 may be similar to or the same as other work stealing operations described herein.

Figure 5:
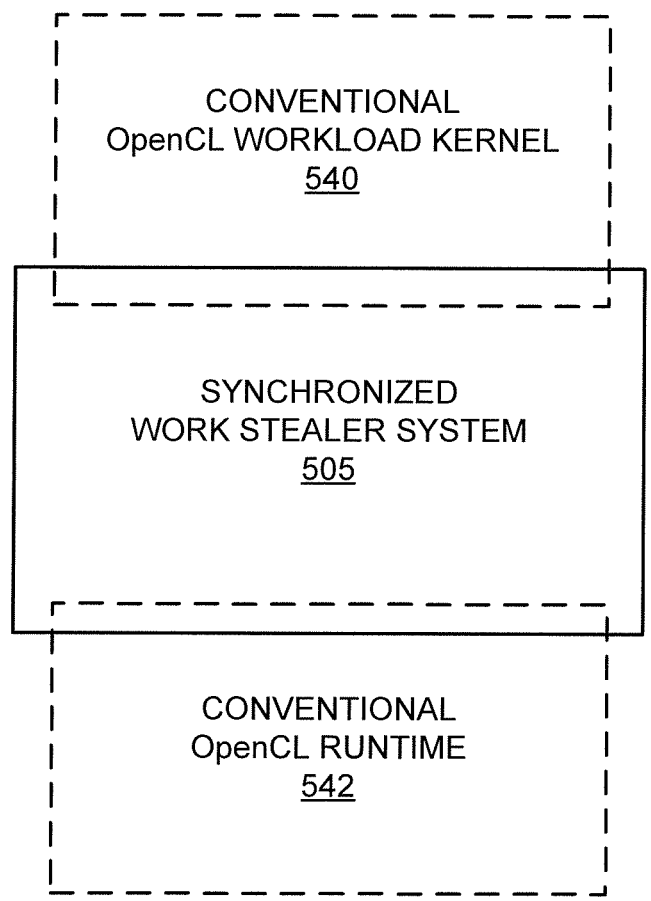
FIG. 5 is a block diagram of an environment in which an embodiment of the synchronized work stealer system may be used.

FIG. 5 is a block diagram of an environment in which an embodiment of the synchronized work stealer system 505 may be used. As shown, in some embodiments, the synchronized work stealer system may be implemented on top of a conventional runtime, such as, for example, on top of a conventional OpenCL runtime 542. In some embodiments, the synchronized work stealer system may wrap a workload, such as, for example, a conventional OpenCL workload kernel 540, into additional work stealing scheduler code. In some embodiments, the OpenCL runtime, or other runtime (e.g., CUDA runtime), may not needs not to be substantially modified.

Figure 6:
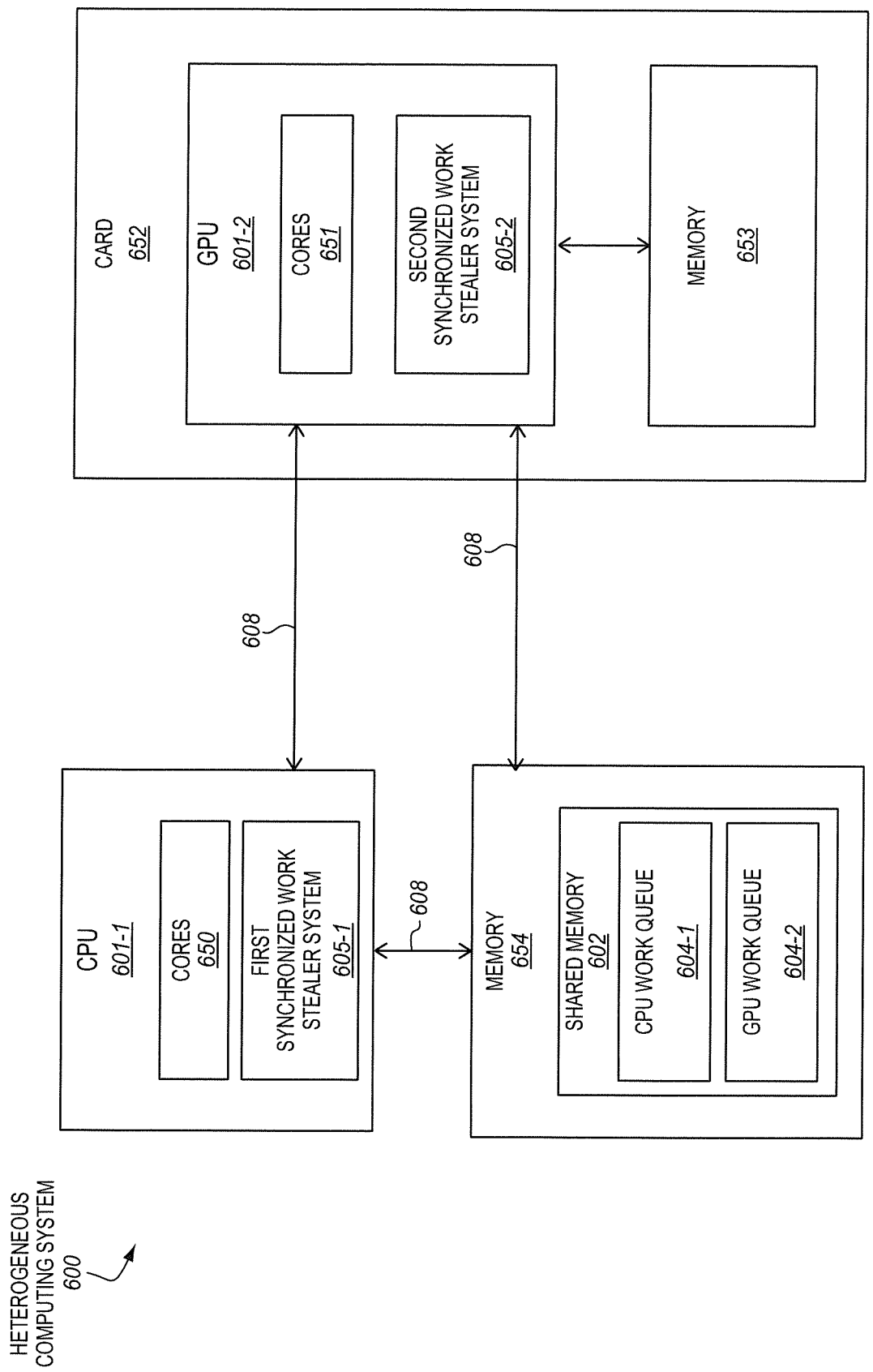
FIG. 6 is a block diagram of an example embodiment of a heterogeneous computing or computer system.

FIG. 6 is a block diagram of an example embodiment of a heterogeneous computing or computer system 600. The system includes a CPU 601-1 and a card 652 having a GPU 601-2. The CPU includes any desired number of cores 650. The GPU includes any desired number of cores 651. The card also has a memory 653 that is coupled with the GPU. In some embodiments, the memory may include DRAM, although this is not required. The CPU and the GPU are both coupled together and both coupled with a memory 653 by interconnect 608. Any known interconnect is suitable, such as, for example, Peripheral Component Interconnect and derivatives or extensions thereof.

The memory 654 includes a shared memory 602. The shared memory includes a CPU work queue 604-1 and a GPU work queue 604-2. The CPU has a first synchronized work stealer system 605-1. The GPU has a second synchronized work stealer system 605-2. In some embodiments, either or both of these synchronized work stealer systems may be similar to or the same as those described elsewhere herein. For example, the second synchronized work stealer system 605-2 may be similar to or the same as the second synchronized work stealer system 105-2 of FIG. 1 and/or the synchronized work stealer system 205 of FIG. 2.

Figure 7:
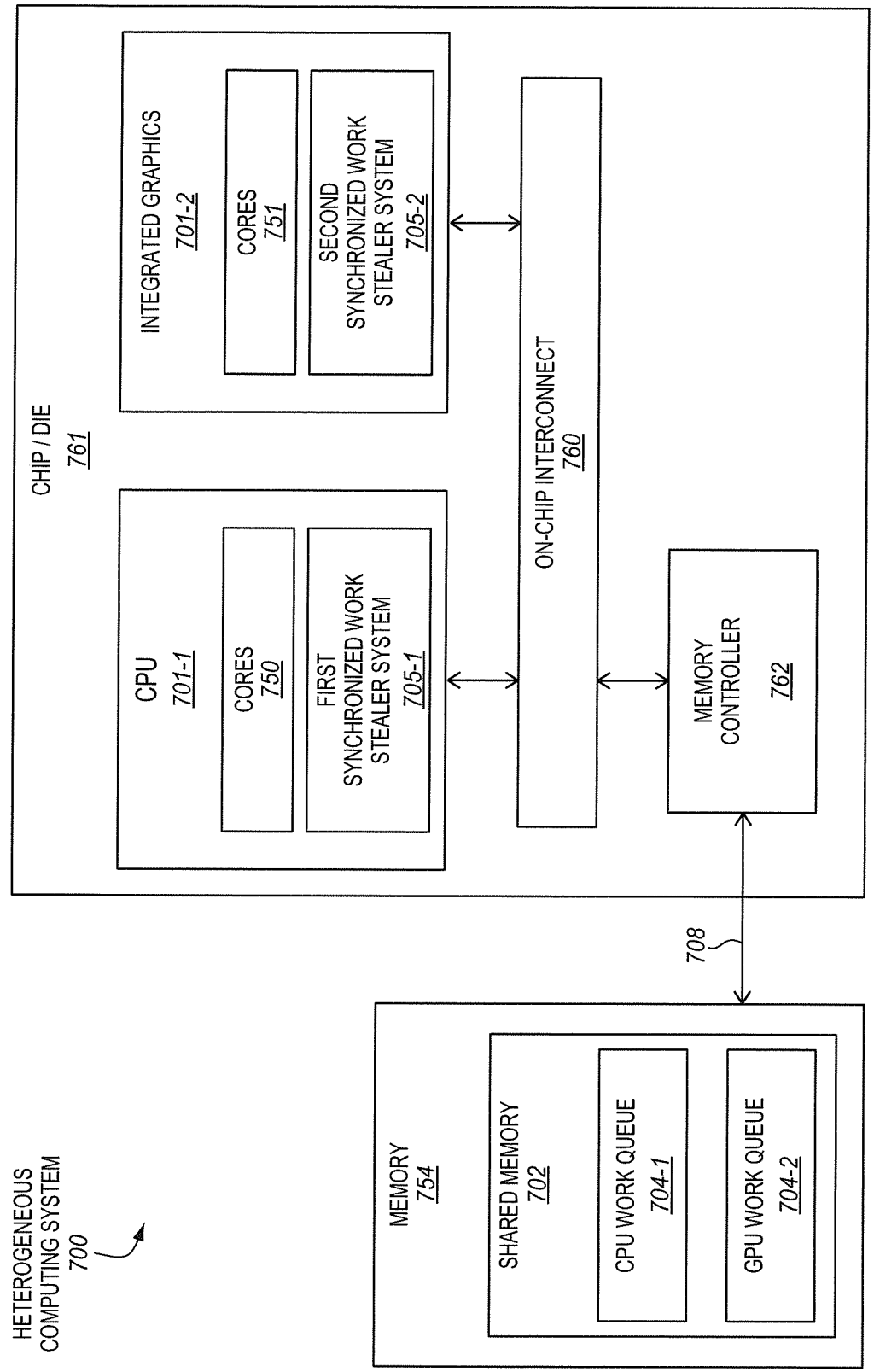
FIG. 7 is a block diagram of an example embodiment of a heterogeneous computing or computer system.

FIG. 7 is a block diagram of an example embodiment of a heterogeneous computing or computer system 700. The system includes a chip and/or die 761 coupled with a memory 754 by an interconnect. In some embodiments, the memory 754 may include DRAM, although this is not required. Any known interconnect is suitable, such as, for example, Peripheral Component Interconnect and derivatives or extensions thereof. The chip/die includes a CPU 701-1 and integrated graphics 701-2. The CPU includes any desired number of cores 750. The integrated graphics includes any desired number of cores 751. The CPU and the integrated graphics are both coupled with an on-chip interconnect 760. Any on-chip interconnect mechanism known in the arts is suitable. An integrated memory controller 762 is also coupled with the on-chip interconnect. The memory controller couples the chip/die with the memory 754 by the interconnect 708

The memory 754 includes a shared memory 702. The shared memory includes a CPU work queue 704-1 and an integrated graphics work queue 704-2. The CPU has a first synchronized work stealer system 705-1. The integrated graphics has a second synchronized work stealer system 705-2. In some embodiments, either or both of these synchronized work stealer systems may be similar to or the same as those described elsewhere herein. For example, the second synchronized work stealer system 705-2 may be similar to or the same as the second synchronized work stealer system 105-2 of FIG. 1 and/or the synchronized work stealer system 205 of FIG. 2.

The following code illustrates use of example embodiment of a suitable synchronized work stealer system:

```
/* Comments:
    1. The global workstealing queue data structure, ws_q,
       holds all the workstealing queues for the CPU cores and
       the GPU core. This data structure is allocated in the
       shared memory between the CPU and GPU.
    2. The workstealing queues ws_q[0], . . . ,ws_q
       [num_cpu_threads-1] represent the queues for CPU cores.
       The ws_q[num_cpu_threads] represent the GPU work-
       stealing queue. num_cpu_threads denotes the total number
       of CPU cores in the heterogeneous system. All these
       workstealing queues are allocated in the shared memory
       between the CPU and GPU. Each workstealing queue is
       described in the "WSQueue" data structure below.
    3. Each GPU computation kernel is defined by the
       subroutine "actual_kernel" that takes as argument the
       index of the iteration space on which it opertes on.
       The details of this subroutine is user application
       specific.
    4. The subroutine "kernel_wrapper" described below is a
       software based wrapper that is generated by the
       compiler compiling the GPU kernel, or by the
       application itself, or by the OpenCL runtime.
    5. The subroutine "steal_wrapper" described below finds
       work across workstealing queues of CPU and GPU cores.
       If found any work, it performs steal operation on the
       corresponding workstealing queue. If nothing is found
       in all the queues, return EMPTY.
    6. The subroutine "steal" performs the actual steal from a
       given workstealing queue. When it steals, it first
       ensures that there is at least one work in the queue
       and then atomically updates the top pointer of the
       queue to ensure concurrent stealing is performed
       correctly.
    7. The subroutine "cas" performs compare and set operation
       on shared memory between CPU and GPU.
*/
/* Each computational kernel, e.g., "actual_kernel" is
wrapped with this subroutine to perform work-stealing
between CPU and GPU worksteaing queues; This wrapper code
is either performed by the user/compiler or the OpenCL
runtime. */
_kernel void kernel_wrapper (
    _global WSQueue *ws_q, /*workstealing queue data
structure for both cpu & gpu allocated in shared memory*/
    int num_cpu_threads /*number of cpu cores*/
) {
    int local_id = get_local_id(0) ; // local_id of this
work-item within the work-group
    _local int work_idx; // index in the total iteration
space; work-items in a work-group share this
    while (true) {
        if (local_id == 0) { // only the leader, 0th work-
item in the work-group, is allowed to steal
            while(true) {
                work_idx = steal_wrapper(ws_q,
num_cpu_threads); // find work by stealing, see below
                if (work_idx >= 0) break; // found work
                else if (work_idx == EMPTY) return; //
```

```
nothing to steal, then TERMINATE
            }
        }
        barrier (CLK_LOCAL_MEM_FENCE); // local memory
barrier; This ensures work_idx is visible to all the work-
items in a work-group;
        if (work_idx == EMPTY) return; // return if we
found no work either locally or by stealing
        /* invoke the actual opencl kernel */
        actual_kernel(work_idx + local)_id);
    }
}
/* This subroutine sequentially walks over all the
workstealing queues and tries to look for work. If nothing
is found in all the queues, return EMPTY indicating
termination. */
int steal_wrapper( global WSQueue *ws_q, int
num_cpu_threads) {
    /* ws_q[num_cpu_threads] represents the GPU
workstealing queue, so we traverse in reverse order to find
work from GPU queue first and then the CPU queues.*/
    for(int i=num_cpu_threads; i>=0; i--) {
        _global WSQueue each_ws_q = ws_q[i];
        work_idx = steal(each_ws_q); // Perform actual
steal operation from the workstealing queue
        if (work_idx >= 0) return work_idx; // If found
work, return the index to work from.
    }
    return EMPTY; // Return EMPTY if no work is found in
all the queues.
}
/* This subroutine performs the actual steal operation for
stealing work from a given queue */
int steal( global WSQueue *a_ws_q) {
    int top = a_ws_q->top; // points to the top entry in
the workstealing queue
    int bottom = a_ws_q->bottom; // points to the bottom
entry in the workstealing queue
    _global CircularArray *array = a_ws_q->activeArray;
// find the array where the pair (min,max) are stored
    int size = bottom - top; // find the number of
entries in the workstealing queue
    if (size <= 0) { // if there is no work, return EMPTY
        return EMPTY;
    }
    int o = (array->segment[top % (1<<array-
>log_size) ] ) .min; // find the index of first chunk at top
    // Now that we found work and are ready to steal, we
perform atomic stealing using a compare and set (cas) on
the top pointer.
    if (!cas(a_ws_q, top, top+1) ) { // compare and set on
the top pointer
        return ABORT; // ABORT if we did not succeed in
atomic operation
    }
    return o; // return the minimum index from the tuple
(min, max) indicating the actual work index
}
/* This subroutine shows the implementation of compare and
set (cas) operation between CPU and GPU on the shared
memory. */
bool cas( global WSQueue *a_ws_q, int oldVal, int newVal) {
    int result;
    result = atomic_cmpxchg((volatile global int
*)&(a_ws_q->top), oldVal, newVal); // perform atomic
compare and exchange operation on shared memory
    return (result == oldVal);
};
/* List of data structures for Workstealing queue
implementation*/
/* Each individual workstealing queue data structure */
typedef struct WS_Q_s {
    volatile int bottom; // bottom of the workstealing
queue
    volatile int top; // top of the workstealing queue
    CircularArray *activeArray; // underlying array to
hold all the work chunks
}WSQueue;
typedef struct CircularArray_s {
    int log_size; // log size used for implementing
circular array of work chunks
    pair_t *segment; // Array for work chunks
}CircularArray;
typedef struct pair_s {
    int min; // minimum index where to start working from,
if stolen
    int max; // maximum index until which to work, if
stolen
}pair_t;
enum WSQ_Tag{
    EMPTY=-2, // indicates the queue is EMPTY and hence
terminate
    ABORT=-1 // indicates that the steal operation did not
succeed successfully due to contention
};
```

Components, features, and details described for any of FIGS. 1 and 4-7 may also optionally be used in any of FIGS. 2-3. Moreover, components, features, and details described herein for any of the apparatus may also optionally be used in any of the methods described herein, which in embodiments may be performed by and/or with such the apparatus.

Example Embodiments

The following examples pertain to further embodiments. Specifics in the examples may be used anywhere in one or more embodiments.

Example 1 is a work stealer apparatus. The work stealer includes a determination module to determine to steal work from a first hardware computation unit of a first type for a second hardware computation unit of a second type that is to be different than the first type. The work is to be queued in a first work queue, which is to correspond to the first hardware computation unit, and which is to be stored in a shared memory that is to be shared by the first and second hardware computation units. The work stealer apparatus also includes a synchronized work stealer module to steal the work through a synchronized memory access to the first work queue, the synchronized memory access to be synchronized relative to memory accesses to the first work queue from the first hardware computation unit.

Example 2 includes the subject matter of Example 1 and optionally in which the synchronized work stealer module is to add the work to a second work queue. The second work queue is to correspond to the second hardware computation unit, and is to be stored in the shared memory. The second type is optionally more special-purpose than the first type.

Example 3 includes the subject matter of Example 1 and optionally in which the synchronized work stealer module is to steal the work through the synchronized memory access that is to include an atomic operation to be performed on the first work queue.

Example 4 includes the subject matter of Example 3 and optionally in which the atomic operation comprises one of a read-modify-write operation, a compare-and-swap operation, a compare-and-exchange operation, a test-and-set operation, a compare-and-set operation, and a load-link/store-conditional operation.

Example 5 includes the subject matter of Example 3 and optionally in which the atomic operation comprises an Open Computing Language (OpenCL) atomic operation.

Example 6 includes the subject matter of Example 3 and optionally in which the synchronized work stealer module is to steal the work through a CUDA synchronized memory access.

Example 7 includes the subject matter of Example 1 and optionally further comprising a second determination module to determine to steal a second work from the second hardware computation unit for the first hardware computation unit. The second work is to be queued in a second work queue, which is to correspond to the second hardware computation unit, and which is to be stored in the shared memory.

Example 8 includes the subject matter of Example 7 and optionally further comprising a second synchronized work stealer module to steal the second work through a second synchronized memory access to the second work queue from the first hardware computation unit. The second synchronized memory access is to be synchronized relative to memory accesses to the second work queue from the second hardware computation unit.

Example 9 includes the subject matter of any of Examples 1-8 and optionally in which the determination module is to determine to steal the work when a second work queue, which is to correspond to the second hardware computation unit, and which is to be stored in the shared memory, is to be one of empty and filled below a threshold level.

Examples 10 includes the subject matter of any of Examples 1-8 and optionally in which the first hardware computation unit is to comprise one selected from a general-purpose processor and a central processing unit (CPU). The second hardware computation unit is to comprise one selected from a graphics processor, a hardware accelerator device, a cryptographic processor, a communications processor, a network processor, a special-purpose processor, a special-purpose core, a highly-parallel special-purpose hardware, a digital signal processor (DSP), and a field programmable gate array (FPGA).

Example 11 includes the subject matter of Example 10 and optionally in which the first hardware computation unit is to comprise the CPU, and in which the second hardware computation unit is to comprise the graphics processor which is selected from a graphics processing unit (GPU) and an integrated graphics core.

Example 12 includes the subject matter of Example 11 and optionally in which the graphics processor is to comprise the integrated graphics core, and in which the integrated graphics core and the CPU share a same last level cache.

Example 13 is a method in a heterogeneous computing system. The method includes determining to steal work from a first hardware computation unit of a first type for a second hardware computation unit of a second, different type that is more special-purpose than the first type. The work is queued in a first work queue which corresponds to the first hardware computation unit and which is stored a shared memory that is shared by the first and second hardware computation units. The method also includes stealing the work including performing a synchronized memory access to the first work queue stored in the shared memory that is synchronized relative to memory accesses to the first work queue from the first hardware computation unit.

Example 14 includes the subject matter of Example 13 and optionally further comprising adding the work to a second work queue, which corresponds to the second hardware computation unit, and which is also stored in the shared memory.

Example 15 includes the subject matter of Example 13 and optionally in which performing the synchronized memory access comprises performing an atomic operation.

Example 16 includes the subject matter of Example 15 and optionally in which performing the atomic operation comprises performing an atomic operation selected from a read-modify-write operation, a compare-and-swap operation, a compare-and-exchange operation, a test-and-set operation, a compare-and-set operation, and a load-link/store-conditional operation.

Example 17 includes the subject matter of Example 15 and optionally in which performing the atomic operation comprises performing an Open Computing Language (OpenCL) atomic operation.

Example 18 includes the subject matter of Example 15 and optionally in which stealing comprises stealing the work by performing a CUDA synchronized memory access.

Example 19 includes the subject matter of Example 13 and optionally further comprising determining to steal a second work and stealing the second work from the second hardware computation unit for the first hardware computation unit. The second work is queued in a second work queue which corresponds to the second hardware computation unit and which is stored in the shared memory.

Example 20 includes the subject matter of Example 19 and optionally in which stealing the second work comprises performing a synchronized memory access to the second work queue from the first hardware computation unit that is synchronized relative to memory accesses to the second work queue from the second hardware computation unit.

Example 21 includes the subject matter of Example 13 and optionally in which determining comprises determining to steal the work in response to determining that a second work queue which corresponds to the second hardware computation unit and which is stored the shared memory is one of empty and filled below a threshold level.

Example 22 includes the subject matter of Example 13 and optionally in which the first hardware computation unit is one selected from a general-purpose processor, a central processing unit (CPU), and a system on chip having multiple general-purpose cores. Also in which the second hardware computation unit is one selected from a graphics processor, a hardware accelerator device, a cryptographic processor, a communications processor, a network processor, a special-purpose processor, a special-purpose core, a special-purpose core on a system on chip, a highly-parallel special-purpose hardware, a digital signal processor (DSP), and a field programmable gate array (FPGA).

Example 23 includes the subject matter of Example 22 and optionally in which the first hardware computation unit comprises the CPU, and in which the second hardware computation unit comprises the graphics processor which is selected from a graphics processing unit (GPU) and an integrated graphics core.

Example 24 includes the subject matter of Example 22 and optionally in which the graphics processor comprises the integrated graphics core, and in which the integrated graphics core and a core of the CPU share a same last level cache.

Example 25 is a heterogeneous computer system. The heterogeneous computer system includes an interconnect. The heterogeneous computer system also includes a first hardware computation unit of a first type coupled with the interconnect. The heterogeneous computer system also includes a second hardware computation unit of a second, different type coupled with the interconnect. The second type is to be more special-purpose than the first type. The heterogeneous computer system also includes a dynamic random access memory (DRAM) coupled with the interconnect, the DRAM to include a shared memory that is to be shared by the first and second hardware computation units. The shared memory to include a first work queue to queue work for the first hardware computation unit and a second work queue to queue work for the second hardware computation unit. The heterogeneous computer system also includes a work stealer apparatus to determine to steal and steal work from the first queue and add it to the second queue through a synchronized memory access to the first work queue. The synchronized memory access is to be synchronized relative to memory accesses to the first work queue from the first hardware computation unit.

Example 26 includes the subject matter of Example 25 and optionally in which the work stealer apparatus is to steal the work through the synchronized memory access that is to include an atomic operation on the first work queue.

Example 27 includes the subject matter of any of Examples 25-26 and optionally further comprising a second work stealer apparatus to determine to steal and steal a second work from the second work queue and add it to the first work queue through a second synchronized memory access to the second work queue, the second synchronized memory access to be synchronized relative to memory accesses to the second work queue from the second hardware computation unit.

Example 28 is one or more computer-readable storage medium storing instructions that, if executed by a machine, will cause the machine to perform operations. The operations include an operation to determine to steal work from a first hardware computation unit of a first type for a second hardware computation unit of a second, different type that is to be more special-purpose than the first type. The work is to be queued in a first work queue which is to corresponds to the first hardware computation unit and which is to be stored a shared memory that is to be shared by the first and second hardware computation units. The operations include an operation to steal the work through a synchronized memory access that is to be performed to the first work queue. The synchronized memory access is to be synchronized relative to memory accesses to the first work queue from the first hardware computation unit.

Example 29 includes the subject matter of Example 28 and optionally in which the machine-readable storage medium further provides instructions that, if executed by the machine, will cause the machine to performing operations including add the work to a second work queue, which is to correspond to the second hardware computation unit, and which is to be stored in the shared memory.

Example 30 includes the subject matter of any of Example 28-29 and optionally in which the machine-readable storage medium further provides instructions that, if executed by the machine, will cause the machine to performing operations including steal the work through the synchronized memory access that is to include performing an atomic operation on the first queue.

Example 31 is a machine-readable storage medium storing instructions that if executed by a machine are to cause the machine to perform the method of any of Examples 13-24.

Example 32 is an apparatus comprising means for performing the method of any of Examples 13-24.

Example 33 is an apparatus to perform the method of any of Examples 13-24.

Example 34 is an apparatus to perform a method substantially as described herein.

Example 35 is an apparatus comprising means for performing a method substantially as described herein.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, a processor may be coupled with a device by one or more intervening component (e.g., one or more interconnects and/or a chipset). In the figures, arrows are used to show connections and couplings.

In the description and claims, the term "logic" may have been used. As used herein, logic may include a module such as hardware, firmware, software, or a combination thereof. Examples of logic include integrated circuitry, application specific integrated circuits, analog circuits, digital circuits, programmed logic devices, memory devices including instructions, etc.

The term "and/or" may have been used. As used herein, the term "and/or" means one or the other or both (e.g., A and/or B means A or B or both A and B).

In the description above, for purposes of explanation, numerous specific details have been set forth in order to provide a thorough understanding of embodiments of the invention. It will be apparent however, to one skilled in the art, that one or more other embodiments may be practiced without some of these specific details. The particular embodiments described are not provided to limit the invention but to illustrate it through example embodiments. The scope of the invention is not to be determined by the specific examples but only by the claims. In other instances, well-known circuits, structures, devices, and operations have been shown in block diagram form or without detail in order to avoid obscuring the understanding of the description.

Where considered appropriate, reference numerals, or terminal portions of reference numerals, have been repeated among the figures to indicate corresponding or analogous elements, which may optionally have similar or the same characteristics, unless specified or clearly apparent otherwise. In some cases, where multiple components have been described, they may be incorporated into a single component. In other cases, where a single component has been described, it may be partitioned into multiple components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, one or more instructions, that if and/or when executed by a machine are operable to cause the machine to perform and/or result in the machine performing one or operations, methods, or techniques disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In another embodiment, the machine-readable medium may include a transitory machine-readable communication medium, for example, the electrical, optical, acoustical or other forms of propagated signals, such as carrier waves, infrared signals, digital signals, or the like.

Examples of suitable machines include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers, and other computer systems, computing devices, or electronic devices having one or more processors.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

RELATED APPLICATIONS

This patent arises from a continuation of U.S. patent application Ser. No. 15/391,549, filed on Dec. 27, 2016, (now U.S. Pat. No. 11,138,048) and entitled "WORK STEALING IN HETEROGENEOUS COMPUTING SYSTEMS," which is a continuation of U.S. patent application Ser. No. 13/976,579, filed on Jun. 27, 2013, and entitled "WORK STEALING IN HETEROGENEOUS COMPUTING SYSTEMS," which is a U.S. National Stage Patent Application under 35 U.S.C. § 371 of PCT Patent Application No. PCT/US2013/032707, filed Mar. 15, 2013, and entitled "WORK STEALING IN HETEROGENEOUS COMPUTING SYSTEMS." Priority to U.S. patent application Ser. No. 15/391,549, U.S. patent application Ser. No. 13/976,579, and PCT Patent Application No. PCT/US2013/032707 is claimed. U.S. patent application Ser. No. 15/391,549, U.S. patent application Ser. No. 13/976,579, and PCT Patent Application No. PCT/US2013/032707 are hereby incorporated herein by reference in their entireties.

What is claimed is:

1. An apparatus comprising:
    first computation circuitry of a first type;
    interface circuitry to access a first work queue corresponding to the first computation circuitry and a second work queue corresponding to second computation circuitry of a second type;
    load balancing instructions to obtain tasks from a workload by encoding first and second index ranges of a data parallel operation;
    determination instructions to make a determination to move a task from the second work queue and add the task to the first work queue, the first computation circuitry and the second computation circuitry corresponding to a work-group, the determination to move the task after a determination that the first computation circuitry is a leader in the work-group and based on load balancing and at least one of processing speed or reduced power consumption; and
    the first computation circuitry to cause the move of the task from the second work queue via an atomic operation, the atomic operation to perform a read operation and a write operation to update a pointer of the second work queue in a same bus cycle during the move of the task, the atomic operation to prevent multiple entities from moving the task.

2. The apparatus of claim 1, wherein the first computation circuitry is to move the task from the second work queue in response to the first work queue filled below a first threshold level and the second work queue filled above a second threshold level.

3. The apparatus of claim 1, wherein the first computation circuitry is to enqueue the task in the first work queue to be processed by the first computation circuitry.

4. The apparatus of claim 1, wherein the first computation circuitry is a central processing unit and the second computation circuitry is a graphics processing unit.

5. The apparatus of claim 1, wherein the first computation circuitry is a central processing unit and the second computation circuitry is a hardware accelerator.

6. The apparatus of claim 1, further including shared memory to include the first work queue and the second work queue.

7. The apparatus of claim 6, wherein the atomic operation is to prevent corruption of a shared data structure used to implement the second work queue.

8. At least one non-transitory machine-readable medium comprising instructions to cause at least one first processor circuit of a first type to at least:
    encode first and second index ranges of a data parallel operation;
    allocate a first task from a workload to a first work queue corresponding to the first processor circuit; and
    move a second task to the first work queue from a second work queue corresponding to a second processor circuit of a second type, the first processor circuit and the second processor circuit corresponding to a work-group, the move after a determination that the first processor circuit is a leader in the work-group, the move based on load balancing and at least one of processing speed or reduced power consumption, the move atomically performed via a read operation and a write operation to update a pointer of the second work queue in a same bus cycle to prevent multiple entities from moving the second task in the same bus cycle.

9. The at least one non-transitory machine-readable medium of claim 8, wherein the instructions are to cause one or more of the at least one first processor circuit to move the second task from the second work queue after the first work queue is filled below a first threshold level and the second work queue is filled above a second threshold level.

10. The at least one non-transitory machine-readable medium of claim 8, wherein the instructions are to cause one or more of the at least one first processor circuit to enqueue the second task in the first work queue to be processed by the at least the first processor circuit.

11. The at least one non-transitory machine-readable medium of claim 8, wherein the at least one first processor circuit is a central processing unit and the second processor circuit is a graphics processing unit.

12. The at least one non-transitory machine-readable medium of claim 8, wherein the at least one first processor circuit is a central processing unit and the second processor circuit is a hardware accelerator.

13. The at least one non-transitory machine-readable medium of claim 8, wherein the instructions are to cause one or more of the at least one first processor circuit to cause storing of the first work queue and the second work queue in a shared memory.

14. The at least one non-transitory machine-readable medium of claim 13, wherein the instructions are to cause one or more of the at least one first processor circuit to use an atomic operation to perform the move to prevent corruption of a shared data structure used to implement the second work queue.

15. A method comprising:
obtaining tasks from a workload by encoding first and second index ranges of a data parallel operation;
allocating a first task from the workload to a first work queue corresponding to first computation circuitry of a first type;
allocating a second task from the workload to a second work queue corresponding to second computation circuitry of a second type; and
moving the second task from the second work queue to the first work queue via an atomic operation, the first computation circuitry and the second computation circuitry corresponding to a work-group, the moving after a determination that the first computation circuitry is a leader in the work-group, the atomic operation to perform a read operation and a write operation to update a pointer of the second work queue in a same bus cycle during the moving of the second task, the atomic operation to prevent multiple entities from moving the second task in the same bus cycle, the moving of the second task based on load balancing and at least one of processing speed or reduced power consumption.

16. The method of claim 15, wherein the moving of the second task from the second work queue is in response to the first work queue filled below a threshold level and the second work queue filled above a second threshold level.

17. The method of claim 15, wherein the second task in the first work queue is to be processed by the first computation circuitry.

18. The method of claim 15, wherein the first computation circuitry is a central processing unit and the second computation circuitry is a graphics processing unit.

19. The method of claim 15, wherein the first computation circuitry is a central processing unit and the second computation circuitry is a hardware accelerator.

20. The method of claim 15, further including storing the first work queue and the second work queue in a shared memory.

21. The method of claim 15, wherein the atomic operation prevents corruption of a shared data structure used to implement the second work queue.

22. An apparatus comprising:
interface circuitry;
machine-readable instructions; and
at least one processor circuit to be programmed by the machine-readable instructions to:
allocate a first task to a first work queue of a first one of the at least one processor circuit corresponding to a first type of circuitry;
allocate a second task to a second work queue of a second processor circuit corresponding to a second type of circuitry;
determine to re-allocate the second task from the second work queue to the first work queue after a determination that the first one of the at least one processor circuit is a leader of a work-group that includes the second processor circuitry and the first one of the at least one processor circuit; and
re-allocate the second task from the second work queue to the first work queue based on load balancing and at least one of processing speed or reduced power consumption, the re-allocating including a read operation and a write operation performed atomically to update a pointer of the second work queue in a same bus cycle to prevent multiple entities from re-allocating the second task before completing the re-allocating.

23. The apparatus of claim 22, wherein one or more of the at least one processor circuit to re-allocate the second task from the second work queue after the first work queue is filled below a first threshold level and the second work queue is filled above a second threshold level.

24. The apparatus of claim 22, wherein one or more of the at least one processor circuit to enqueue the second task in the first work queue to be processed by the first one of the at least one processor circuit.

25. The apparatus of claim 22, wherein the first one of the at least one processor circuit is a central processing unit and the second processor circuit is at least one of a graphics processing unit or a hardware accelerator.

* * * * *